United States Patent [19]

Mashino et al.

[11] Patent Number: 4,618,811
[45] Date of Patent: Oct. 21, 1986

[54] VOLTAGE REGULATOR FOR CHARGING GENERATOR

[75] Inventors: Keiichi Mashino, Katsuta; Morio Satou, Toukai-mura; Shouju Masumoto, Katsuta; Kunio Kobayashi; Osamu Miki, both of Takasaki, all of Japan

[73] Assignees: Hitachi, Ltd.; Hitachi Automotive Engineering Co., Ltd., both of Tokyo, Japan

[21] Appl. No.: 578,794

[22] Filed: Feb. 10, 1984

[30] Foreign Application Priority Data

Feb. 10, 1983 [JP] Japan ................................ 58-19807

[51] Int. Cl.⁴ .............................................. H02J 7/14
[52] U.S. Cl. ........................................ 322/28; 322/99; 320/64
[58] Field of Search ............... 322/28, 99; 320/64, 320/68, 61

[56] References Cited

U.S. PATENT DOCUMENTS

| | | | |
|---|---|---|---|
| 3,656,135 | 4/1972 | Ruff | 322/99 UX |
| 3,663,946 | 5/1972 | Iwaki | 322/28 X |
| 3,942,096 | 3/1976 | Itoh et al. | 322/28 |
| 3,942,097 | 3/1976 | Itoh et al. | 322/28 |
| 3,944,905 | 3/1976 | Allport et al. | 322/28 X |
| 3,959,708 | 5/1976 | Allport et al. | 322/28 X |
| 3,984,755 | 10/1976 | Lehnhoff et al. | 322/28 |

Primary Examiner—R. J. Hickey
Attorney, Agent, or Firm—Antonelli, Terry & Wands

[57] ABSTRACT

A voltage regulator for a charging generator is disclosed which comprises an a.c. generator having armature windings and a field winding, and a battery which receives the rectified output of the a.c. generator and is charged by the same. The voltage regulator regulates the output voltage of the a.c. generator by controlling the current flowing through the field winding. To prevent the output voltage of the a.c. generator from becoming a high voltage when a connecting wire connecting the rectified output of the a.c. generator to the battery is broken, the regulator also includes an abnormality detection means which compares the rectified output of the a.c. generator with the battery voltage and detects the abnormality when both voltages are different by more than a predetermined value. This arrangement makes it possible to detect the abnormality at the point of time where the output voltage of the a.c. generator is not yet very high.

7 Claims, 8 Drawing Figures

VOLTAGE REGULATOR FOR CHARGING GENERATOR

BACKGROUND OF THE INVENTION

This invention relates to a voltage regulator for a charging generator. More particularly, the present invention relates to a voltage regulator for a charging generator which is mounted to an automobile and suppresses a high voltage generated when disconnection of the output wires of the generator occurs.

A voltage regulator for a charging generator regulates the output voltage of the generator for charging a battery and holds the battery voltage connected to the generator at a predetermined level. The voltage regulator compares the battery voltage with a reference voltage and regulates the voltage. In this case, if disconnection of connecting wires connecting the generator to the battery occurs, the power is not fed to the battery and hence, the battery voltage drops. Accordingly, the output voltage of the generator rises so as to raise the battery voltage. When the voltage of the generator becomes a high voltage, the load connected directly to the output of the generator undergoes breakage or is burnt out. To solve this problem, the regulator is constructed so that when the output voltage of the generator exceeds a predetermined voltage, the operation of the generator is stopped. This construction is known in the art from Japanese Patent Laid-Open No. 157942/1980, for example. In the case where a heavy load is connected to the battery, the output voltage of the generator will rise if this heavy load is drastically released. Accordingly, the voltage which stops the generation of the generator must be set to a voltage higher than the voltage which rises when the load is released, since otherwise the operation of the generator will be stopped undesirably whenever the heavy load is released. However, if the voltage for stopping the generator operation is set to a high level, an undesirably high voltage will be impressed upon the load in a case where the connecting series between the generator and the battery become broken.

SUMMARY OF THE INVENTION

The present invention is therefore directed to provide a voltage regulator for a charging generator which is devoid of the problems described above. In other words, the present invention is directed to provide a voltage regulator for a charging generator which accurately detects the disconnection of connecting wires connecting the rectified output from the generator to the battery and does not apply any damage to the load.

Another object of the present invention is to provide a voltage regulator for a charging generator which can accomplish the object described above with a simple circuit construction.

The voltage regulator for a charging generator in accordance with the present invention is based upon the technical concept that when the connecting wires connecting the rectified output from the generator to the battery are disconnected or broken, the output voltage of the generator is different from the battery voltage but there is no remarkable difference between the output voltage and the battery voltage when the heavy load is released. Thus, the voltage regulator of the invention detects abnormality by comparing the rectified output voltage with the battery voltage.

This comparsion can be easily accomplished by detecting the voltage difference or a voltage ratio.

It is necessary to raise an alarm using a simple device when the abnormality is detected. In the present invention, a circuit construction is employed in which the operation of the generator is stopped at the time of trouble and a current flows from the battery through a charge lamp so that the charge lamp is lit to raise the alarm.

DESCRIPTION OF THE PREFERRED EMBODIMENTS

Figure 1:
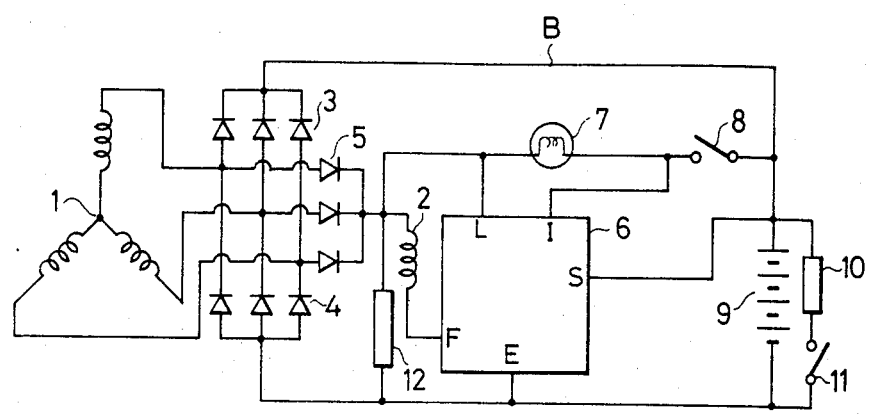
FIG. 1 is a circuit diagram of a voltage regulator for a charging generator in accordance with one embodiment of the present invention.

FIG. 1 is a circuit diagram of the voltage regulator for a charging generator in accordance with one embodiment of the present invention. The charging generator consists of Y-connected armature windings 1 and a field winding 2. The a.c. output of the armature windings 1 is converted to a d.c. output by three-phase full-wave rectifiers 3, 4 and an auxiliary rectifier 5. The voltage regulator 6 controls the current flowing through the field winding 2 and regulates the output voltage of the generator. Power is also supplied from a battery 9 to the field winding 2 through a key switch 8 and a charge lamp 7. This circuit supplies the power to the field winding 2 until the output of the generator reaches a predetermined value. The power which is converted to d.c. by the three-phase full-wave rectifiers 3, 4 is applied to the battery 9. A load 10 is connected to the battery 9 via a switch 11. On the other hand, another load 12 such as an auto-choke, heater or the like is connected to a connecting wire that connects the charge lamp 7 to the cathode of the auxiliary rectifier 5.

Figure 2:
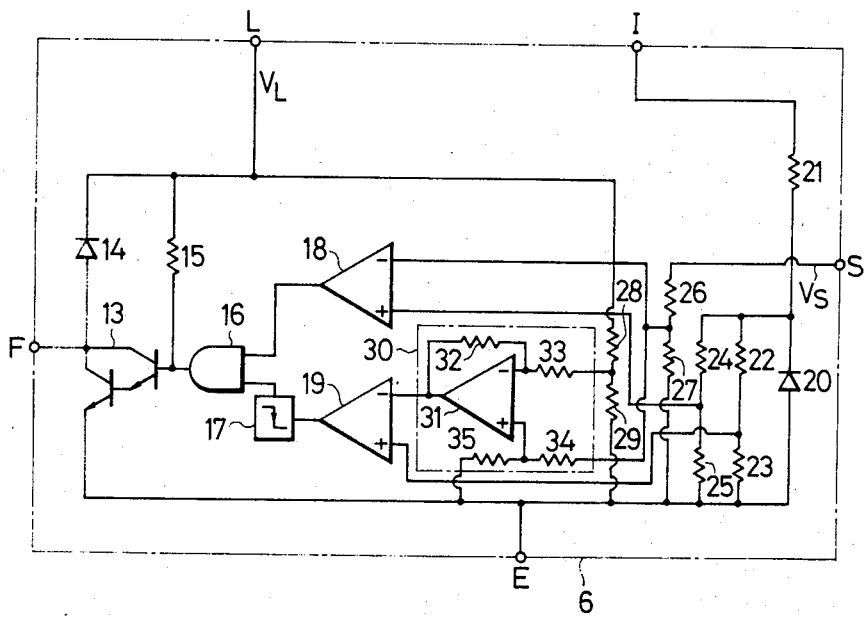
FIG. 2 is a circuit diagram of the internal circuit of the voltage regulator shown in FIG. 1.

FIG. 2 is a circuit diagram showing the internal circuit of the voltage regulator 6 shown in FIG. 1. A Darlington-connection power transistor 13 is connected to the F terminal which is in turn connected to the field coil 2. A flywheel diode 14 is also connected to the F terminal. The other end of this diode is connected to the L terminal so that when the power transistor 13 is turned off, it circulates the current flowing through the field winding 2 and prevents the occurrence of a high voltage in the field winding 2. A resistor 15 is interposed between the L terminal and the base of the power transistor 13 and applies a base current to the power transistor 13. An AND circuit 16 is connected to the base of the power transistor 13. One of the input terminals of the AND circuit 16 is connected to a comparator 18 with the other being connected to another comparator 19 via a holding circuit 17. A constant voltage diode 20 is disposed between I and E terminals via a resistor 21. A series circuit of resistors 22 and 23 and a series circuit of resistors 24 and 25 are connected in parallel with one another to the constant voltage diode 20 so as to divide the voltage that is generated by the constant voltage diode 20. A series circuit of resistors 26 and 27 is connected between S and E terminals to divide the voltage at the S terminal. A series circuit of resistors 28 and 29 is also disposed between the L and E terminals to divide the voltage at the L terminal. The voltage at the S terminal and the divided voltage of the set voltage are applied to the comparator 18. The divided voltage formed by the resistors 22, 23 is applied to one of the input terminals of the comparator 19 and the output voltage of a differential amplifier 30 is applied to the other. The differential amplifier 30 includes an operational amplifier 31 and resistors 32 through 35. The divided voltage at the S terminal is applied to one of the terminals of the differential amplifier 30 and the divided voltage at the L terminal, to the other.

The circuit having the construction described above operates in the following manner. When the key switch 8 is actuated, an initial exciting current flows from the battery through the charge lamp 7, the field winding 2 and the power transistor 13. Under this state, the constant voltage diode 20 inside the voltage regulator 6 supplies a predetermined voltage and the voltage at the S terminal, which is connected to the positive terminal of the battery 9, is below the set voltage $V_s$ (ordinarily about 14.7 V) that is given by the resistors 22 through 25. Accordingly, the comparator 18 is at the high level.

Since the voltages at the L and S terminals as the input of the differential amplifier 30 are substantially the same, the output of the differential amplifier 30 is at the low level. For this reason, the output of the comparator 19 is at the high level. When the comparator output is at the high level, the holding circuit 17 transmits the high level as such to the AND circuit 16, so that the output of the AND circuit 16 is at the high level and the power transistor 13 becomes conductive.

Next, when the generator starts generation, the voltage of the battery 9 rises and the current to the field winding 2 is supplied from the armature windings 1 through the auxiliary rectifier 5. Accordingly, the current does not flow from the battery 9 to the field winding 2 any longer and the charge lamp is turned off. When the voltage of the battery 9 exceeds the set voltage $V_s$, the output of the comparator 18 drops to the low level and the output of the AND circuit 16 drops also to the low level. Hence, the power transistor 13 becomes non-conductive.

The field current attenuates through the flywheel diode 14 and reduces the output voltage of the generator. When the output voltage of the generator drops and the voltage of the battery 9 also drops, the voltage at the S terminal drops and the output of the comparator 18 rises to the high level. The output voltage of the AND circuit 16 rises then to the high level and the power transistor 13 becomes conductive, thereby raising the voltage of the generator. The operations described above are repeated and the battery voltage is controlled to a predetermined voltage, that is, to the set voltage $V_s$.

Next, the protective operation when the connecting wires between the generator and the battery 9 are disconnected or broken will be explained.

When the point B of the wire in FIG. 1 is broken, for example, the battery 9 is not charged so that the voltage at the S terminal is low, the output of the comparator 18 is always at the high level, the power transistor 13 remains conductive, the output voltage of the generator becomes higher, the current flowing through the field winding 2 increases and the output voltage becomes all the more higher, thus establishing the non-control state. However, since the voltage difference between the voltage at the L terminal as the output terminal of the generator and the voltage at the S terminal as the voltage of the battery 9 is detected by the differential amplifier 30, the output voltage of the differential amplifier 30 becomes greater. When it exceeds the predetermined voltage, the output of the comparator 19 drops to the low level. The holding circuit 17 holds this low level until it is reset. Accordingly, the output of the AND circuit 16 changes to the low level, whereupon the power transistor 13 is turned off and the supply of the current to the field winding 2 is stopped. The current of the field winding 2 then attenuates. Accordingly, the generator stops power generation and prevents the output voltage from reaching a high voltage. Since the operation of the generator is stopped, on the other hand, the current flows from the battery 9 through the charge lamp 7 and the load 12 and the charge lamp 7 is lit to raise the alarm.

The advantages brought forth by the construction described above will be explained with reference to FIGS. 3, 4 and 5.

Figure 3:
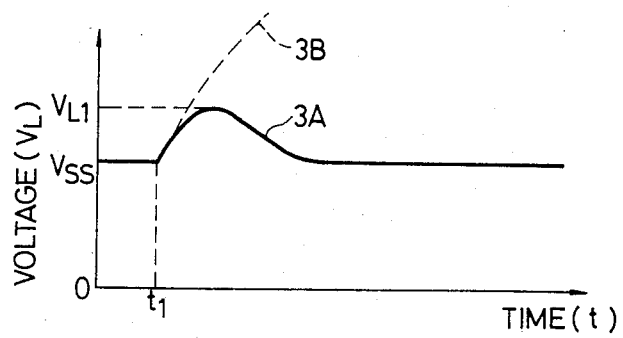
FIG. 3 is a waveform chart showing the voltage ($V_L$) at the L terminal.

FIG. 3 is a diagram showing the relation between the voltage $V_L$ at the cathode of the auxiliary diode 5, that is, the voltage at the L terminal, and the time (t). Curve 3A represents the voltage change when the load 10 shown in FIG. 1 is a heavy load and the switch 11 is abruptly opened. The voltage $V_L$ at the L terminal instantaneously rises from the reference voltage $V_{ss}$ to the maximum voltage $V_{L1}$ because the field current can not change abruptly due to the flywheel diode 14.

Curve 3B represents the voltage waveform when breakage of the wire takes place. It has been a customary practice to detect the voltage $V_L$ at the L terminal so that when the voltage $V_L$ exceeds a predetermined voltage $V_{L0}$, the operation of the generator is stopped. If the predetermined voltage $V_{L0}$ is below the maximum voltage $V_{L1}$ described above, however, the generator operation will be also stopped when the heavy load is stopped. Accordingly, the predetermined voltage $V_{L0}$ must be higher than the maximum voltage $V_{L1}$. In this case, the voltage $V_L$ at the L terminal is higher than the maximum voltage $V_{L1}$.

Figure 4:
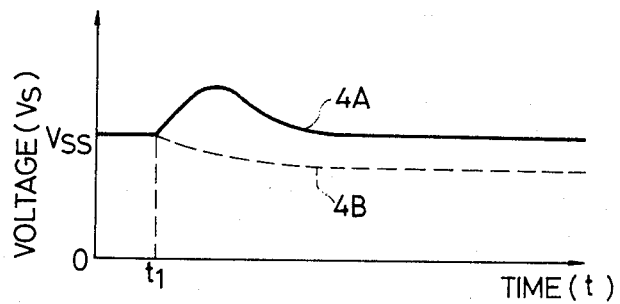
FIG. 4 is a waveform chart showing the voltage ($V_S$) at the S terminal.
Figure 5:
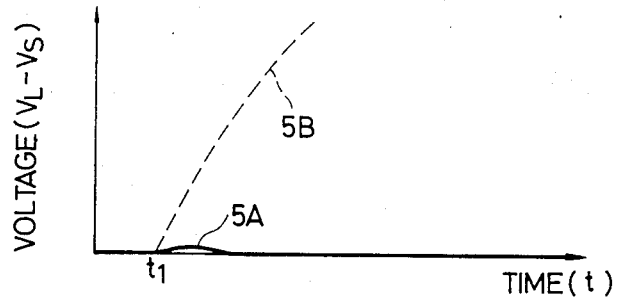
FIG. 5 is a waveform chart showing the difference voltage ($V_L - V_S$) between the voltage at the L terminal and that at the S terminal.

FIG. 4 is a diagram showing the change of the voltage $V_S$ at the S terminal connected to the positive terminal of the battery 9 with respect to time. In the diagram, curve 4A represents the waveform when the load is changed over from ON to OFF and curve 4B does the waveform when the connecting wire B connecting the output of the generator to the battery 9 is broken. FIG. 5 shows the relation between the voltage difference $(V_L - V_S)$ of the voltage $V_L$ at the L terminal and the voltage $V_S$ at the S terminal and the time. The waveform 5A when the load is released is remarkably smaller than the waveform 5B when the connecting wire B is broken. Since the present invention detects the voltage difference between the voltage $V_L$ at the L terminal and the voltage $V_S$ at the S terminal as the abnormal voltage, it can accurately detect abnormality.

Figure 6:
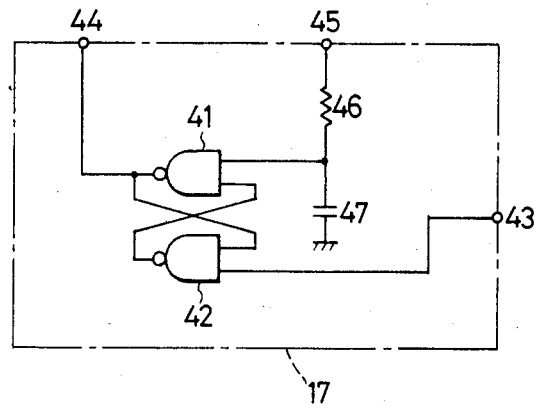
FIG. 6 is a circuit diagram showing the internal circuit of a holding circuit of FIG. 2.

FIG. 6 illustrates one example of the holding circuit showing in FIG. 1. In the drawing, two NAND gates 41 and 42 constitute a flip-flop. The input terminal 43 is connected to the input of one (42) of the NAND gates and the output of the NAND gate 41 is connected to the output terminal 44. A resistor 46 and a capacitor 47 are interposed between the power terminal 45 and the ground and the junction between the resistor and capacitor is connected to the NAND gate 41. The power terminal 45 is connected to the I terminal shown in FIG. 2. When the voltage at the power terminal 45 is at the low level, the output of the NAND gate 41 is at the high level and the output terminal is at the high level, too. After the key switch 8 is made, the time delay circuit consisting of the resistor 46 and the capacitor 47 resets the output terminal 44 to the high level. Next, when the input terminal 43 drops to the low level, the flip-flop inverts and the output terminal 44 drops to the low level. This state is kept when the input terminal 43 rises to the high level until the key switch 8 is turned off and the voltage at the power terminal 45 drops to the low level. Accordingly, the operation as the holding circuit 17 shown in FIG. 2 is satisfied.

Figure 7:
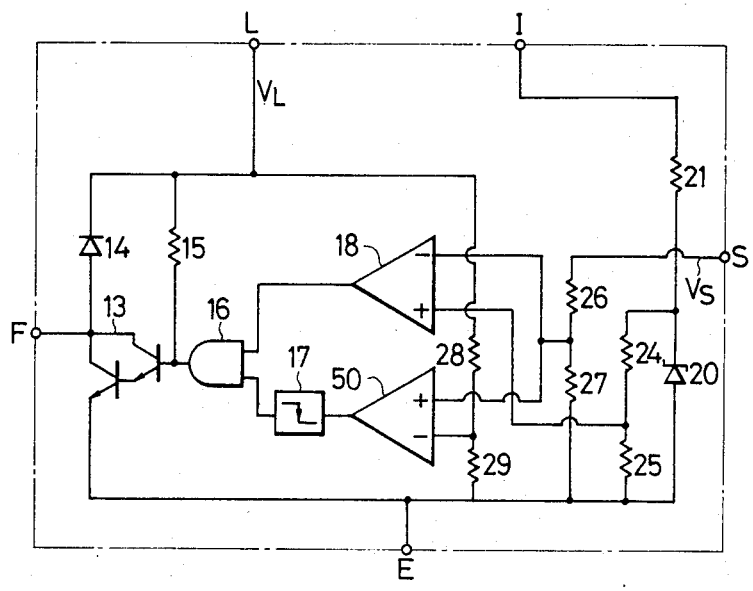
FIG. 7 is a circuit diagram of the voltage regulator in accordance with another embodiment of the present invention.

FIG. 7 illustrates the voltage regulator in accordance with another embodiment of the present invention. In the drawing, like reference numerals are used to identify like constituents as in FIG. 2. The foregoing embodiment detects whether or not the voltage difference between the voltage at the L terminal and the voltage at the S terminal exceeds the predetermined value, whereas this embodiment detects the ratio of the voltage at the L terminal to the voltage at the S terminal. In the drawing, the divided voltages of $V_S$ and $V_L$ at the S and L terminals are applied respectively to a comparator 50.

In the construction described above, the voltage regulating operation under the steady state is accomplished in the same way as in the embodiment shown in FIG. 2 and hence, the explanation is omitted.

Figure 8:
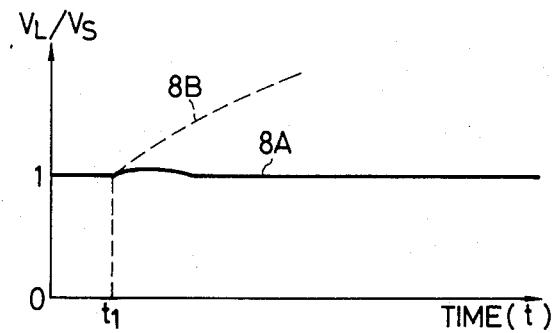
FIG. 8 is a waveform chart showing the voltage ratio of the voltage at the L terminal to the voltage at the S terminal.

The case where the connecting wire between the generator and the battery 9 shown in FIG. 1 is broken will be explained with reference to FIG. 8. The voltages $V_L$ and $V_S$ at the L and S terminals are the same as those shown in FIGS. 3 and 4, respectively, when the switch 11 of the load 10 is abruptly changed from ON to OFF at the time $t_1$, and remains substantially at 1; hence, no great change occurs. When the connecting wire B is broken, on the other hand, a great change occurs as represented by curve 8B.

The divided voltage of the voltage $V_L$ at the L terminal by the resistors 28, 29 and the divided voltage of $V_s$ at the S terminal by the resistors 26, 27 are applied to the comparator 50 shown in FIG. 7, so that the comparator 50 detects the ratio $V_L/V_S$ of the voltage $V_L$ at the L terminal to the voltage $V_S$ at the S terminal and the output voltage of the comparator 50 drops to the low level under the following condition;

$$\frac{V_L}{V_S} > \frac{R_{28} + R_{29}}{R_{26} + R_{27}} \cdot \frac{R_{27}}{R_{29}}$$

where $R_{26}$, $R_{27}$, $R_{28}$, $R_{29}$ represent the resistance values of the resistors 26 through 29, respectively. When the comparator 50 reaches the low level, the low level is transmitted to the AND circuit 16 through the holding circuit 17 and the power transistor 13 is cut off. This state continues until the holding circuit 17 is reset. Accordingly, the generator stops the power generating operation and it becomes possible to prevent the output voltage from rising to the high voltage.

According to this embodiment, the circuit construction can be more simplified than the embodiment shown in FIG. 2 and disconnection of the connecting wires can be reliably detected, even at the initial state, in the same way as the foregoing embodiment. Hence, it becomes possible to prevent the high voltage from being impressed upon the load and the voltage regulator.

In the embodiments described above, the current flows from the battery to the load 12 through the charge lamp and lights the charge lamp when the generator stops the power generating operation. However, it is also possible to employ a circuit construction in which a new circuit becomes conductive from the battery through the charge lamp when the voltage at the L terminal becomes the high voltage in order to raise the alarm of abnormality.

What is claimed is:

1. A voltage regulator for a charging generator comprising: an a.c. generator having armature windings and a field winding; rectification means for rectifying an a.c. output of said a.c. generator to a d.c. output; a battery connected to an output terminal of said rectification means to receive power from said a.c. generator; an initial exciting current supply circuit including a key switch and a charge lamp connecting said battery to said field winding; a load connected parallel to said field winding; a voltage regulator including means for comparing the battery voltage with a reference voltage and means for controlling a current flowing through said field winding in accordance with an output of said comparing means; and abnormality detection means for comparing an output voltage of said rectification means with the battery voltage and producing an abnormality indication output when a difference between both voltages exceeds a predetermined value, wherein said current controlling means in said voltage regulator cuts off a current flowing through said field winding in accordance with the abnormality indication output of said abnormality detection means so that the power generation of said a.c. generator is stopped and a current from said battery flows through said initial exciting current supply circuit and said load to light said charge lamp in said initial exciting current supply circuit.

2. The voltage regulator for a charging generator as defined in claim 1 wherein said abnormality detection means includes a differential amplifier detecting the voltage difference between the output voltage of said rectification means and the battery voltage, and a comparator producing said abnormality indication output when the output of said differential amplifier exceeds a predetermined value.

3. The voltage regulator for a charging generator as defined in claim 1 wherein said abnormality detection means comprises a comparator including means for detecting a ratio of the output voltage of said rectification means to the battery voltage and means for producing said abnormality indication output when said ratio exceeds a predetermined value.

4. The voltage regulator for a charging generator comprising: an a.c. generator having armature windings and a field winding; rectification means for rectifying an a.c. output of said a.c. generator to a d.c. output; a battery connected to an output terminal of said rectification means to receive power from said a.c. generator through said rectification means; a voltage regulator including means for comparing the battery voltage with a reference voltage and means for controlling a current flowing through said field winding in accordance with an output of said comparing means; abnormality detection means for comparing an output voltage of said rectification means with the battery voltage and producing an abnormality indication output when a difference between both voltages exceeds a predetermined value; and current cut-off means for controlling said voltage regulator in accordance with the abnormality indication output of said abnormality detection means and for cutting off the current supplied to said field winding in accordance with said abnormality indication output which further includes a holding circuit for holding the output of said abnormality detection means until said holding circuit is reset.

5. A voltage regulator for a charging generator comprising: an a.c. generator having armature windings and a field winding; main rectification means for converting an a.c. output of said a.c. generator to a d.c. output; a battery connected to an output terminal of said main rectification means to receive power from said a.c. generator; said field winding being connected to an output terminal of said auxiliary rectification means; an initial exciting current supply circuit including a key switch and a charge lamp connecting said battery to said field winding; a load connected to the output terminal of said auxiliary rectification means; comparison means for comparing the battery voltage with a reference voltage; switching means for controlling a current flowing through said field winding in accordance with the output of said comparison means; abnormality detection means comparing an output voltage of said auxiliary rectification means with the battery voltage and generating an abnormality indication output when a difference of both voltages exceeds a predetermined value, wherein said swithcing means cuts off a current flowing through said field winding in accordance with the abnormality indication output of said abnormality detection means so that the power generation of said a.c. generator is stopped and a current from said battery flows through said initial exciting current supply circuit and said load to light said charge lamp in said initial exciting current supply circuit.

6. The voltage regulator for a charging generator as defined in claim 5 wherein said abnormality detection means includes a differential amplifier detecting the difference between the output voltage of said auxiliary rectification means and the battery voltage and a comparator generating said abnormality indication output when the output voltage of said differential amplifier is greater than a set voltage.

7. The voltage regulator for a charging generator comprising: an a.c. generator having armature windings and a field winding; main rectification means and auxiliary rectification means, each including means for converting an a.c. output of said a.c. generator to a d.c. output; a battery connected to an output terminal of said main rectification means to receive power from said a.c. generator through said rectifier; said field winding being connected to said battery through a key switch and a charge lamp and to an output terminal of said auxiliary rectification means; comparison means for comparing the battery voltage with a reference voltage; switching means subjected to control by an output of said comparison means and including means for controlling a current flowing through said field winding in accordance with the output of said comparison means; abnormality detection means comparing the output voltage of said auxiliary rectification means with the battery voltage and generating an abnormality indication output when a difference of both voltages exceeds a predetermined value; current cut-off means for controlling said switching means in accordance with the abnormality indication output of said abnormality detection means and for cutting off the current supplied to said field winding in accordance with said abnormality indication output; and a load connected to said charge lamp on the opposite side to said battery; wherein a current flows through a circuit which includes said battery, said charge lamp and said load when an abnormality occurs, and said lamp is lit to raise an alarm of said abnormality which further includes a holding circuit for holding the output of said abnormality detection means until said holding circuit is reset.

* * * * *